(12) United States Patent
Ait Bouziad et al.

(10) Patent No.: US 10,893,770 B2
(45) Date of Patent: Jan. 19, 2021

(54) PUMPING SYSTEM AND METHOD FOR A BEVERAGE PRODUCTION APPARATUS

(71) Applicant: NESTEC S.A., Vevey (CH)

(72) Inventors: Youcef Ait Bouziad, Echandens (CH); Christian Jarisch, Lutry (CH); Alfred Yoakim, St-legier-la Chiesaz (CH); Renzo Moser, Gummenen (CH)

(73) Assignee: Societe des Produits Nestle S.A., Vevey (CH)

( * ) Notice: Subject to any disclaimer, the term of this patent is extended or adjusted under 35 U.S.C. 154(b) by 425 days.

(21) Appl. No.: 14/892,036

(22) PCT Filed: May 21, 2014

(86) PCT No.: PCT/EP2014/060380
§ 371 (c)(1),
(2) Date: Nov. 18, 2015

(87) PCT Pub. No.: WO2014/187837
PCT Pub. Date: Nov. 27, 2014

(65) Prior Publication Data
US 2016/0095465 A1    Apr. 7, 2016

(30) Foreign Application Priority Data
May 24, 2013   (EP) ..................... 13169148

(51) Int. Cl.
*A47J 31/46*      (2006.01)
*F04B 19/24*     (2006.01)
(Continued)

(52) U.S. Cl.
CPC ............. *A47J 31/32* (2013.01); *A47J 31/469* (2018.08); *A47J 31/5255* (2018.08);
(Continued)

(58) Field of Classification Search
CPC . F04B 18/20; F04B 19/24; F04B 19/20; A47J 31/46; A47J 31/462; A47J 31/465;
(Continued)

(56) References Cited

U.S. PATENT DOCUMENTS 5,337,652 A * 8/1994 Fischer .................. A47J 31/32
99/281
5,392,694 A   2/1995 Muller et al.
(Continued)

FOREIGN PATENT DOCUMENTS

CN         201197625 Y    2/2009
CN         102076557 A    5/2011
(Continued)

OTHER PUBLICATIONS

Haar, Gallagher, and Kell; Boiling Point of Water at Various Pressures from NBS-NRC Steam Tables; Hemisphere Publishing Corp; 1984; Obtained Oct. 12, 2017.*
(Continued)

*Primary Examiner* — Connor J Tremarche
(74) *Attorney, Agent, or Firm* — K&L Gates LLP

(57) ABSTRACT

The present invention presents a pumping system (1) with a preheated reservoir (2), a main pump (4) for pumping a preheated liquid (3) from the reservoir (2), and pressurizing means (5) for pressurizing the reservoir (2). Preferably, the pressurizing means set an absolute pressure of 0.5 to 1 bar in the reservoir (2). The liquid (3) in the reservoir (2) can be heated up to 90° C. or more. The present invention achieves a nearly complete suppression of the phenomenon of cavitation at the main pump entrance, and thus achieves an increased pumping performance at elevated liquid temperatures.

13 Claims, 6 Drawing Sheets

(51) Int. Cl.
*A47J 31/32* (2006.01)
*A47J 31/52* (2006.01)
*A47J 31/24* (2006.01)
*A47J 31/34* (2006.01)
*A47J 31/36* (2006.01)

(52) U.S. Cl.
CPC .............. *F04B 19/24* (2013.01); *A47J 31/24* (2013.01); *A47J 31/34* (2013.01); *A47J 31/36* (2013.01)

(58) Field of Classification Search
CPC .. A47J 31/24; A47J 31/32; A47J 31/34; A47J 31/36; A47G 19/14
USPC ........................................................ 417/313
See application file for complete search history.

(56) References Cited

U.S. PATENT DOCUMENTS

| | | | |
|---|---|---|---|
| 7,640,845 B2* | 1/2010 | Woodnorth | A47J 31/46 99/280 |
| 8,151,694 B2* | 4/2012 | Jacobs | A47J 31/46 426/433 |
| 2005/0274738 A1 | 12/2005 | Tomsic et al. | |
| 2007/0056994 A1 | 3/2007 | Woodnorth et al. | |
| 2007/0186780 A1* | 8/2007 | Clark | A47J 31/057 99/275 |
| 2008/0168905 A1 | 7/2008 | Hart | |
| 2009/0071755 A1 | 3/2009 | Hsiao | |
| 2009/0120299 A1* | 5/2009 | Rahn | A47J 31/46 99/279 |
| 2009/0136639 A1* | 5/2009 | Doglioni Majer | A47J 31/36 426/431 |
| 2009/0205502 A1* | 8/2009 | Carbonini | A47J 31/52 99/280 |
| 2010/0024658 A1* | 2/2010 | Jacobs | A47J 31/46 99/302 R |
| 2010/0313765 A1* | 12/2010 | Hale | A47J 31/44 99/288 |
| 2011/0070348 A1* | 3/2011 | Burton-Wilcock | A47J 31/46 426/431 |
| 2011/0200726 A1 | 8/2011 | Tinkler et al. | |
| 2012/0156336 A1* | 6/2012 | Hansen | A47J 31/0605 426/231 |
| 2013/0032036 A1 | 2/2013 | Zhong et al. | |

FOREIGN PATENT DOCUMENTS

| | | | |
|---|---|---|---|
| CN | 202628418 U | 12/2012 | |
| EP | 1915932 | 4/2008 | |
| JP | H11178717 A | 7/1999 | |
| JP | 2005218577 A | 8/2005 | |
| JP | 2006506165 A | 2/2006 | |
| JP | 2007195832 A | 8/2007 | |
| JP | 2010082046 A | 4/2010 | |
| JP | 2012021717 A | 2/2012 | |
| JP | 2012152263 A | 8/2012 | |
| WO | 2006074170 | 7/2006 | |
| WO | WO 2012114092 A2 * | 8/2012 | ................ F22B 1/28 |

OTHER PUBLICATIONS

Japanese Office Action for corresponding application 2016-514383, Dispatch No. 064562, Dispatch Date Feb. 20, 2018, 4 pages.

* cited by examiner

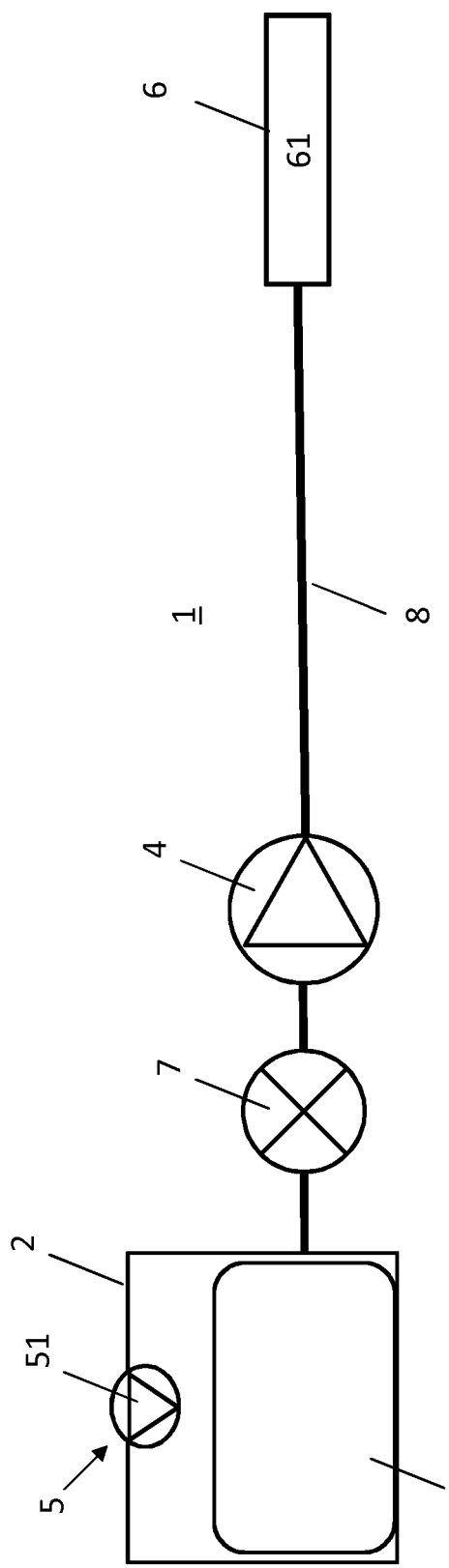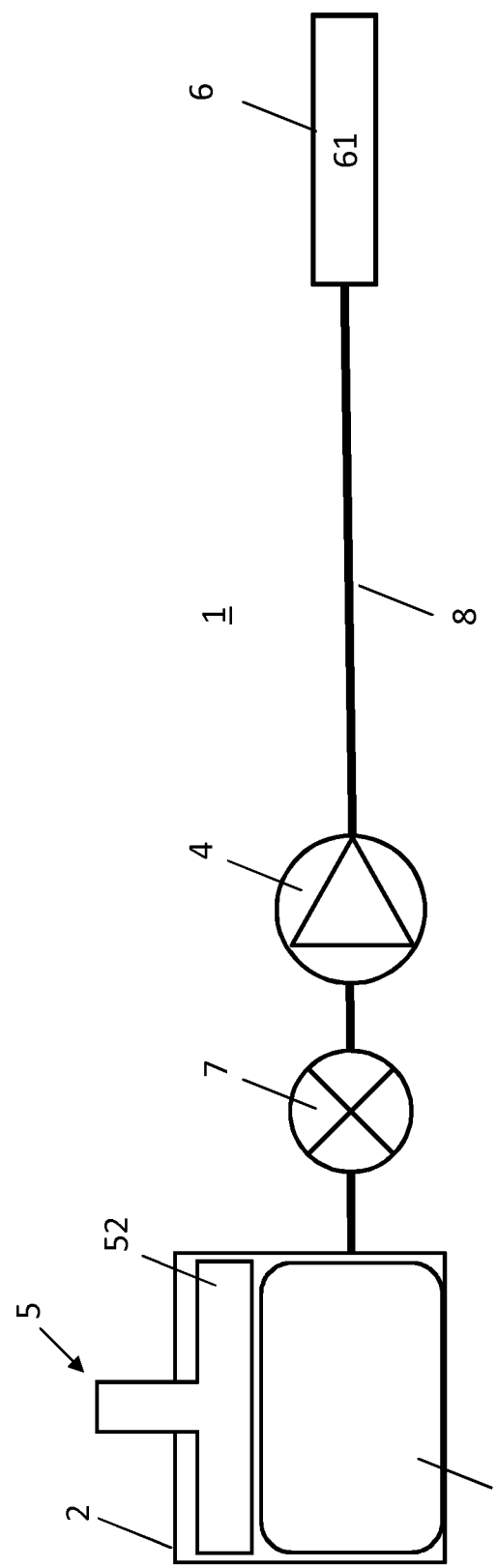

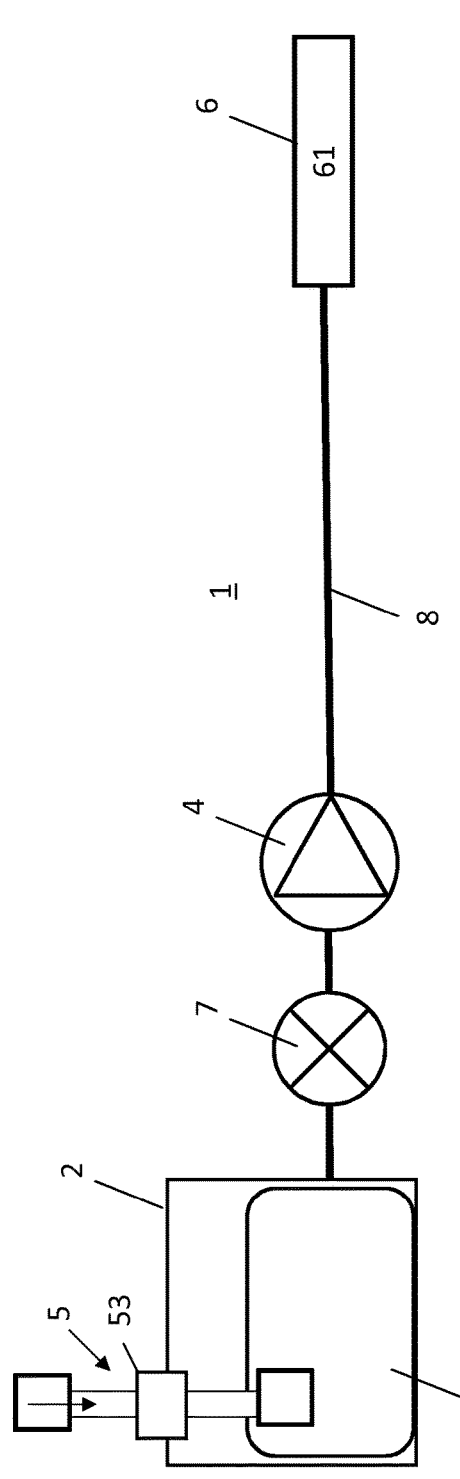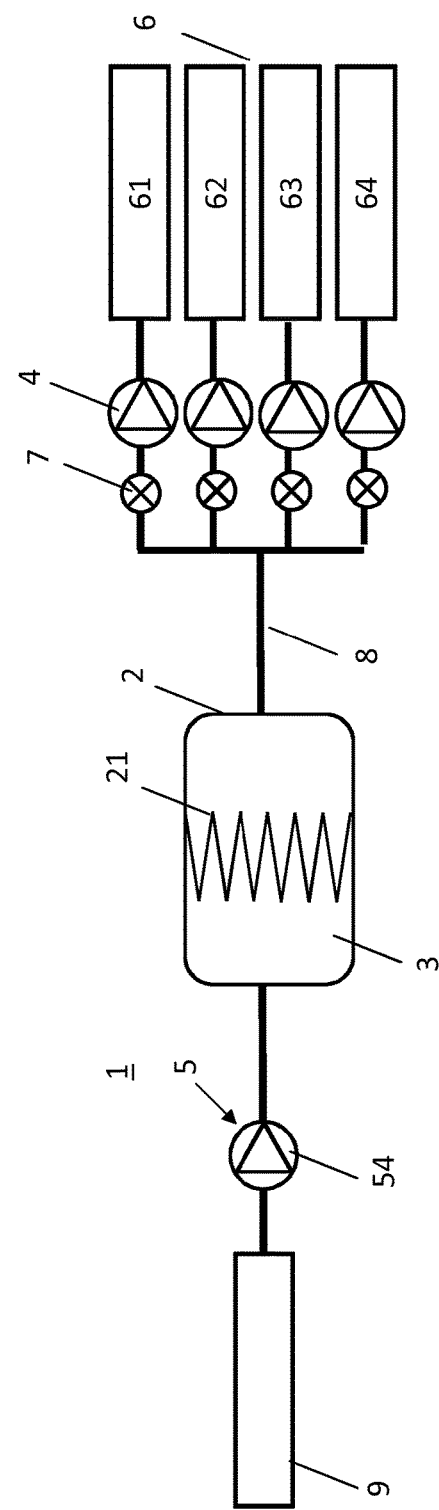

PUMPING SYSTEM AND METHOD FOR A BEVERAGE PRODUCTION APPARATUS

CROSS REFERENCE TO RELATED APPLICATIONS

The present application is a National Stage of International Application No. PCT/EP2014/060380, filed on May 21, 2014, which claims priority to European Patent Application No. 13169148.7, filed on May 24, 2013, the entire contents of which are being incorporated herein by reference.

The present invention relates to a pumping system and a pumping method for a beverage production apparatus. In particular, the present invention presents a pumping system and method for pumping a preheated liquid from a pressurized reservoir, for example, to a brewing or extraction unit of the beverage production apparatus.

From the state of the art various pumping systems used in beverage production apparatuses are known, in particular pumping systems for pumping liquid from a reservoir to a brewing or extraction unit.

FIG. 1 shows a liquid pumping system 11 as used in a known beverage production apparatus. The pumping system 11 includes a reservoir 12 having contained therein a liquid 13, which is pumped by a main pump 14 through a flow meter 17 and through a heater 20 to an extraction unit 16. The heater 20 is provided downstream of the main pump 14.

FIG. 2 shows a further pumping system 11 as used in a known multi-beverage production apparatus. The pumping system 11 comprises a liquid supply 19, a main pump 14 for pumping the liquid 13 through a high-pressure boiler 12, which includes a heater 121, to a plurality of extraction units 16. Again the heater 121 is provided downstream of the main pump 14.

In view of the state of the art described above it is desirable to use a preheated reservoir and a preheated liquid, respectively, i.e. to position a heater upstream of the main pump. If a preheated liquid could be pumped efficiently by the main pump, the beverage production could, for instance, be carried out much faster.

However, when a hot liquid is pumped from a preheated reservoir, the suction pressure generated by the pump can lead to the phenomenon of cavitation at the pump entrance. The phenomenon of cavitation occurs due to the pumped liquid evaporating at the lowered pressure, and inevitably leads to a decrease of the pumping performance.

FIG. 3 shows the physical principle behind the phenomenon of cavitation. In particular, a phase diagram of water is shown, wherein the phase transition conditions between the solid phase, the liquid phase and the gas phase of water, respectively, are indicated as solid lines. A phase transition from the liquid state to the gas state (i.e. evaporation) can occur either through a temperature increase or through a pressure decrease. For example, at ambient temperature (around 20° C.) the absolute pressure for liquid-vapor phase change (vapor pressure) necessary to induce cavitation is around 23 mbar absolute pressure. The main pumps used in known beverage production apparatuses typically generate a suction pressure of around 500 mbar absolute pressure. That means the absolute pressure at suction side (1 bar−0.5 bar=0.5 bars) is higher than the above-mentioned value of 23 mbar so that no problem occurs when water is pumped at ambient temperature.

However, at higher water temperatures, for example at 90° C., the pressure that is necessary to induce cavitation is higher and is around 700 mbar. The pump suction pressure (again 1 bar−0.5 bar=0.5 bars) is now lower than the necessary value of 0.7 bars so that cavitation can occur at the pump entrance, and can significantly decrease the pumping performances.

FIG. 4 shows such a decrease of the pumping performance. The pumping performance of any pump can be expressed as output flow rate vs. output pressure. With increasing temperature the pumping performance drops significantly. For example, at a water temperature of 94° C. the flow-rate drops severely, even at low output pressures.

It is the object of the present invention to improve the state of the art. Thereby, it is an object of the present invention to overcome the above-mentioned disadvantages. In particular, the present invention aims to provide a pumping system for a beverage production apparatus that is able to pump a hot liquid from a preheated reservoir without any significant decrease in pumping performance. Further, the present invention aims to provide a pumping system that is able to suppress the phenomenon of cavitation at the pump entrance (pump suction side).

The above-mentioned objects of the present invention are solved by the attached independent claims. The main idea of the present invention is to increase the suction pressure via a pressurized reservoir. The dependent claims develop further advantages of the present invention.

The present invention is directed to a pumping system for a beverage production apparatus comprising a reservoir for storing and heating a liquid, at least one main pump for pumping the liquid from the reservoir, preferably to at least one extraction unit of the beverage production apparatus, and pressurizing means for pressurizing the reservoir.

By pressurizing the reservoir, i.e. by providing a pressurized reservoir, the absolute suction pressure generated by the pump is increased. By pressurizing the reservoir, the liquid in the reservoir is pressurized as well. Due to the pressure increase, the phenomenon of cavitation can be avoided or at least reduced at the pump entrance. This leads to a recovery in pumping performance at high liquid temperatures. In other words, the pumping performance of the main pump of the preheated liquid is more or less as good as the pumping performance of the main pump of the same liquid at ambient temperature.

The apparatus of the present invention can therefore expedite the production of a beverage. Furthermore, no heater downstream of the main pump is necessary. This is particularly advantageous for mobile beverage production apparatuses, which can be built more compact and with less weight.

Preferably, the pressurizing means is configured to pressurize the reservoir to an absolute pressure of about 0.5 to 1.0 bar, preferably 0.7 to 1.0 bar.

With these preferred pressure values an absolute pressure which is higher than the vapor pressure is achieved before the actual pump entrance, which suppresses the phenomenon of cavitation very effectively. The preferred values take into account all pressure losses in the liquid circuit between the reservoir and the pump, for example, valves, flowmeters, tubes or the like.

In one aspect of the invention, the pressurizing means is an air pump.

The air pump is preferably embedded in the reservoir or is positioned upstream of the reservoir. An air pump is cheap and easy to implement.

In another aspect of the invention, the pressurizing means is a unit for controlling the liquid level and the liquid temperature in the reservoir.

When the liquid in the reservoir is heated, the steam pressure increases. By controlling the liquid level in the reservoir, the steam pressure can be used to set the absolute pressure in the reservoir. Many beverage production apparatuses already have a control unit, which can be programmed accordingly. The solution is therefore particularly easy.

In another aspect of the invention, the pressurizing means is a piston.

The piston is preferably a mechanical piston, which is positioned within or above the reservoir. The piston is configured to push on the reservoir, in order to increase the absolute pressure. The piston can be worked electrically or mechanically.

In another aspect of the invention, the pressurizing means is a liquid pump, preferably a low pressure water pump.

A liquid pump can be easily integrated into a liquid flow circuit, e.g. can be positioned between a water supply and the reservoir. The liquid pump can maintain a certain pressure of the liquid in the reservoir.

The pumping system can be designed for a mobile beverage production apparatus, wherein the reservoir is preferably a thermos.

When a thermos is used as the reservoir, the liquid can be heated before it is filled into the reservoir, and maintains its temperature in the thermos. With the pumping system of the present invention no heater downstream of the main pump is necessary. In combination with the thermos, a small mobile production apparatus for producing hot beverages can be designed.

The pumping system can also be designed for a multi-beverage production apparatus, preferably comprising a plurality of main pumps for pumping the liquid from the reservoir to a plurality of extraction units.

Each main pump can preferably be operated independently, in order to produce one of a variety of different beverages. Each extraction unit can further have its own main pump. Thereby, instead of using a costly single main pump—as known from the state of the art—which delivers a similar extraction pressure for each extraction head, a plurality of smaller and cheaper main pumps can be installed.

Preferably, each one of the plurality of main pumps is configured to pump the liquid with a respective pressure to one of the plurality of extraction units.

Each extraction head can be supplied with liquid by one of the main pumps, wherein preferably the liquid is supplied for each extraction head with a dedicated pressure. Thus, the beverage production apparatus is more versatile.

Further, since different liquid pressures are optimal or necessary for different beverages to be produced, the quality of the beverages offered by the multi-beverage production apparatus can be improved.

Preferably, the reservoir is a low pressure boiler supporting a pressure of about 1 to 3 bar.

Since the main pumps of the pumping system are able to pump the liquid from the boiler, i.e. pump the heated liquid with a high pumping performance, no main pump is required upstream of the reservoir. Preferably, only a low pressure liquid pump is positioned upstream of the reservoir, in order to pressurize the reservoir. As a consequence, a high pressure boiler as used by the state of the art can be replaced by the low pressure boiler, whereby the design of the pumping system becomes simpler, smaller and cheaper.

Preferably, the liquid pump is configured to receive the liquid from a liquid supply.

Preferably, the reservoir is configured to heat the liquid to a temperature up to about 90° C. or more.

The high temperatures allow a significant shortening of the time required for producing a beverage, since the liquid pumped from the reservoir is already suited for beverage production. Due to the pressurized reservoir, the high temperatures are possible for preheating the liquid, without sacrificing pumping performance. Therefore, even beverages that require high pump output pressure (i.e. a high pumping performance), like espresso, can be produced with high quality very quickly.

Preferably, the at least one main pump is configured to pump the liquid heated to 90° C. or more with a maximum flow rate of about 100 to 300 ml/min at a maximum output pressure of respectively about 14 to 3 bar.

That means, the at least one main pump is able to pump a 90° liquid, e.g. water, with a maximum flow rate of 100 ml/min at a maximum output pressure of 14 bar and with a maximum flow rate of 300 ml/min at a maximum output pressure of 3 bar. Within the range defined by these values the maximum flow rate increases nearly linear with a decrease of output pressure. With such a pump, various kinds of beverages (some beverages requiring only low output pressures but high flow-rates, other beverages requiring high output pressures but only low flow-rates) can be produced quickly, due to the preheated reservoir.

The present invention is further directed to a pumping method for use in a beverage production apparatus comprising: heating the liquid in a reservoir, pressurizing the reservoir with pressurizing means, pumping the liquid from the reservoir, preferably to at least one extraction unit of a beverage production apparatus, with at least one main pump.

Preferably, the liquid is heated to 90° C. or more, and the reservoir is pressurized to an absolute pressure of about 0.5 to 1.0 bar.

The pumping method achieves the same advantages as the above-described pumping system, namely that the heated liquid can be pumped with a high pump performance. Consequently, beverages can be produced faster and with improved quality.

The present invention will now be described in more detail in respect to the attached drawings.

BRIEF DESCRIPTION OF THE FIGURES

FIG. 5 shows a pumping system according to the present invention.

FIG. 6 shows a pumping system according to the present invention.

FIG. 7 shows a pumping system according to the present invention.

FIG. 8 shows a pumping system according to the present invention.

FIG. 5 shows a pumping system 1 of the present invention. The pumping system 1 includes a reservoir 2, which is configured to store and heat a liquid 3. The reservoir 2 is therefore a preheated reservoir designed for supplying a preheated liquid. The liquid 3 can for instance be water, milk, soup, water-based liquid, chocolate-based liquid, coffee-based liquid, milk-based liquid, or the like. In particular, the liquid 3 can be any liquid that is suitable for preparing a warm or hot beverage.

Figure 1:
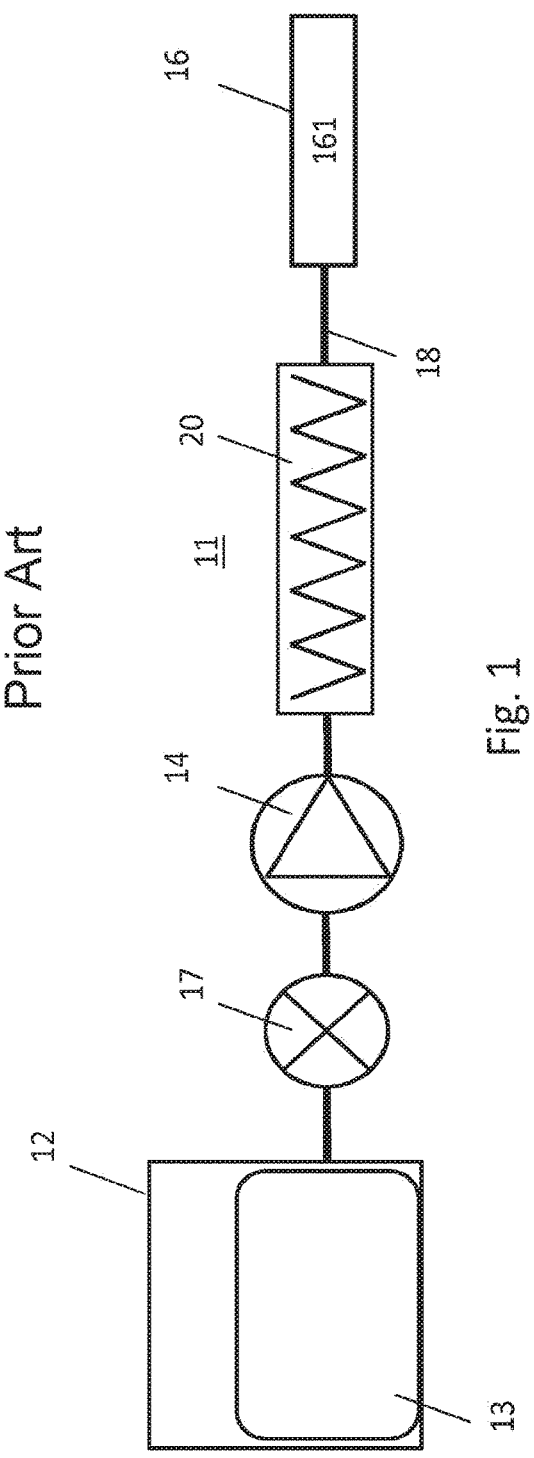
FIG. 1 shows a state of the art pumping system of a beverage production apparatus.

The pumping system 1 shown in FIG. 5 is in particular useful for a mobile beverage production apparatus. Preferably, the reservoir 2 is a thermos for keeping the liquid hot. However, the reservoir 2 can also be a tank or a boiler. The reservoir 2 can also be equipped with active heating means for heating the liquid 3, for example, a heating coil, heating wire or a heating block. The reservoir 2 can further be equipped or connected to a control unit (not shown) that is suitable to control at least the liquid temperature in the reservoir 2.

The reservoir 2 is connected via a liquid flow circuit, e.g. by pipes 8, to a main pump 4. The main pump 4 is configured to pump the liquid 3 from the reservoir 2. Preferably, the main pump 4 is configured to pump the liquid 3 from the reservoir 2 to a brewing or extraction unit 6 of a beverage production apparatus. The main pump 4 can be a hydraulic pump, a gear pump, a peristaltic pump or any other suitable pump for pumping liquid 3. Preferably, the main pump 4 is connected to the reservoir 2 through a flow meter 7 configured for measuring and controlling the flow rate through the main pump 4. The flow meter 7 can feed back the measured values to the control unit or can itself regulate liquid flow into the main pump 4.

The pumping system 1 is further provided with pressurizing means 5 for pressurizing the reservoir 2 and/or the liquid 3 in the reservoir 2. As shown in FIG. 5, the pressurizing means 5 can be an air pump 51. The air pump 51 is either embedded in the reservoir 2 or is provided upstream of the reservoir 2. The air pump 51 is configured to increase or decrease the pressure in the reservoir 2 when activated. The air pump 51 can be controlled by the control unit.

Preferably, the pressurizing means 5 is configured to achieve an absolute pressure in the reservoir 2 of about 0.5 to 1 bar, more preferably 0.7 to 1 bar. This value of pre-pressure is chosen for increasing the pressure before the main pump inlet to a value that efficiently suppresses cavitation of the liquid 3, taking into account all causes of pressure loss in the liquid circuit between the reservoir 2 and the main pump 4, for example, valves, the flow meter, the pipe 8, etc.

By means of the pressurizing means 5, a heated liquid under pressure is provided within the reservoir 2. That means the absolute pressure in the reservoir 2 is increased. Thereby, the absolute suction pressure at the entrance of the main pump 4 is increased as well, so that the phenomenon of cavitation is suppressed. Thereby, the pumping performance of the main pump 4 can be significantly increased, even at liquid temperatures of 70° C. or more, or even 90° C. or more.

The air pump 51 shown in FIG. 5 is one preferred way to increase the absolute pressure in the reservoir 2. FIG. 6 shows an alternative preferred way for increasing the pressure in the reservoir 2. In particular, in FIG. 6 a mechanical piston 52 is used as pressurizing means 5, which is designed to push onto the reservoir 2. The mechanical piston 52 can, for example, be driven by a motor, and can be controlled by the control unit mentioned above. The mechanical piston could also be driven mechanically, and could for instance be designed to be operated manually by a user.

FIG. 7 shows another preferred way of increasing the pressure in the reservoir 2. Here the pressurizing means 5 is realized by a unit 53, which can be realized by the control unit mentioned above, but can also be a separate unit. The unit 53 is preferably configured to control the liquid level in the reservoir 2. Preferably, the unit 53 is also configured to control the liquid temperature in the reservoir 2. Then the steam pressure caused by heating the liquid 3 can be employed to increase the pressure within the reservoir 2. In order to control the liquid level, the unit 53 is preferably connected to some sort of liquid supply, and is preferably able to increase or decrease the amount of liquid 3 within the reservoir 2.

FIG. 8 shows another pumping system 1 of the present invention, which is particularly advantageous for a multi-beverage production apparatus. The multi-beverage production apparatus can, for example, be an apparatus that is able to produce tea, coffee, espresso and/or chocolate drinks, or the like. Therefore, the multi-beverage production apparatus is preferably equipped with a plurality of brewing or extraction units 6. FIG. 8 shows, for example, four brewing or extraction units 61-64, which can respectively be used to prepare a different beverage.

The pumping system 1 of the present invention comprises in this case a plurality of main pumps 4, wherein each of the main pumps 4 is dedicated to one of the brewing or extraction units 61-64 of the beverage production apparatus. The main pumps 4 are each configured to pump the liquid 3 from the preheated reservoir 2 via pipe 8, preferably through a plurality of flow meters 7, into the respective beverage extraction units 61-64. The main pumps 4 can be designed according to the above description.

The reservoir 2 is preferably a boiler. Therefore, the reservoir 2 is preferably equipped with heating means 21. The heating means 21 can, for example, be a heating wire, a heating coil or a heating block. The reservoir 2 has a liquid inlet and a liquid outlet, and is configured to preferably heat the liquid 3 while the liquid 3 is pumped through the reservoir 2. Preferably, the reservoir 2 is designed as a low-pressure boiler, i.e. a boiler that supports a pressure of up to about 1 to 3 bar. The state of the art typically uses high-pressure boilers, which support pressures of up to about 10 to 15 bar. However, high pressure boilers are much more complicated and expensive to produce.

Again the pumping system 1 includes pressurizing means 5. The pressurizing means 5 is preferably a low-pressure pump 54. The pressurizing means 5 is preferably connected to a liquid supply 9, which is used to supply the liquid 3 into the reservoir 2.

Figure 2:
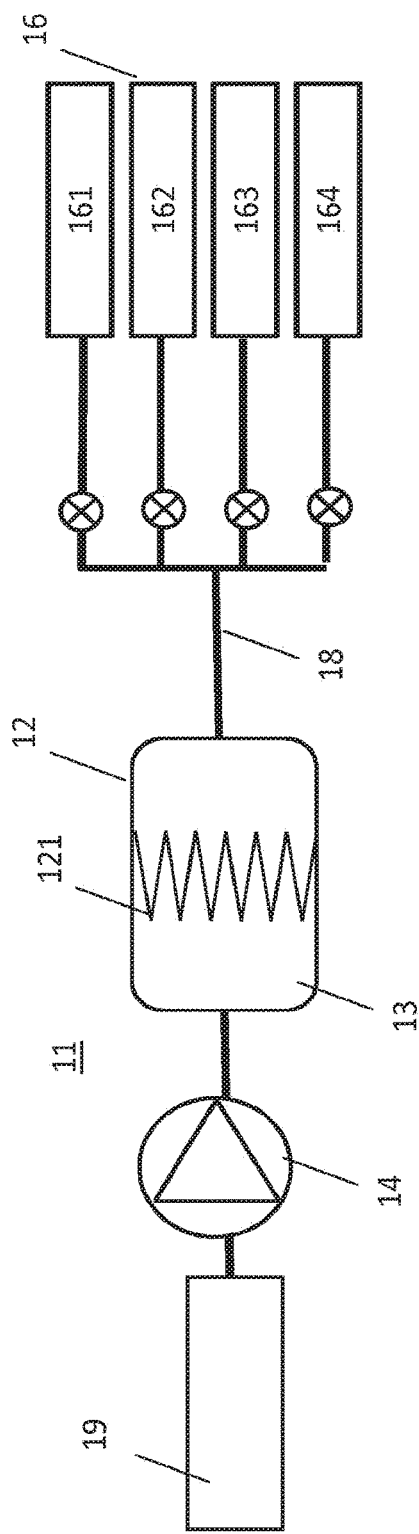
FIG. 2 shows a state of the art pumping system of a multi-beverage production apparatus.
Figure 3:
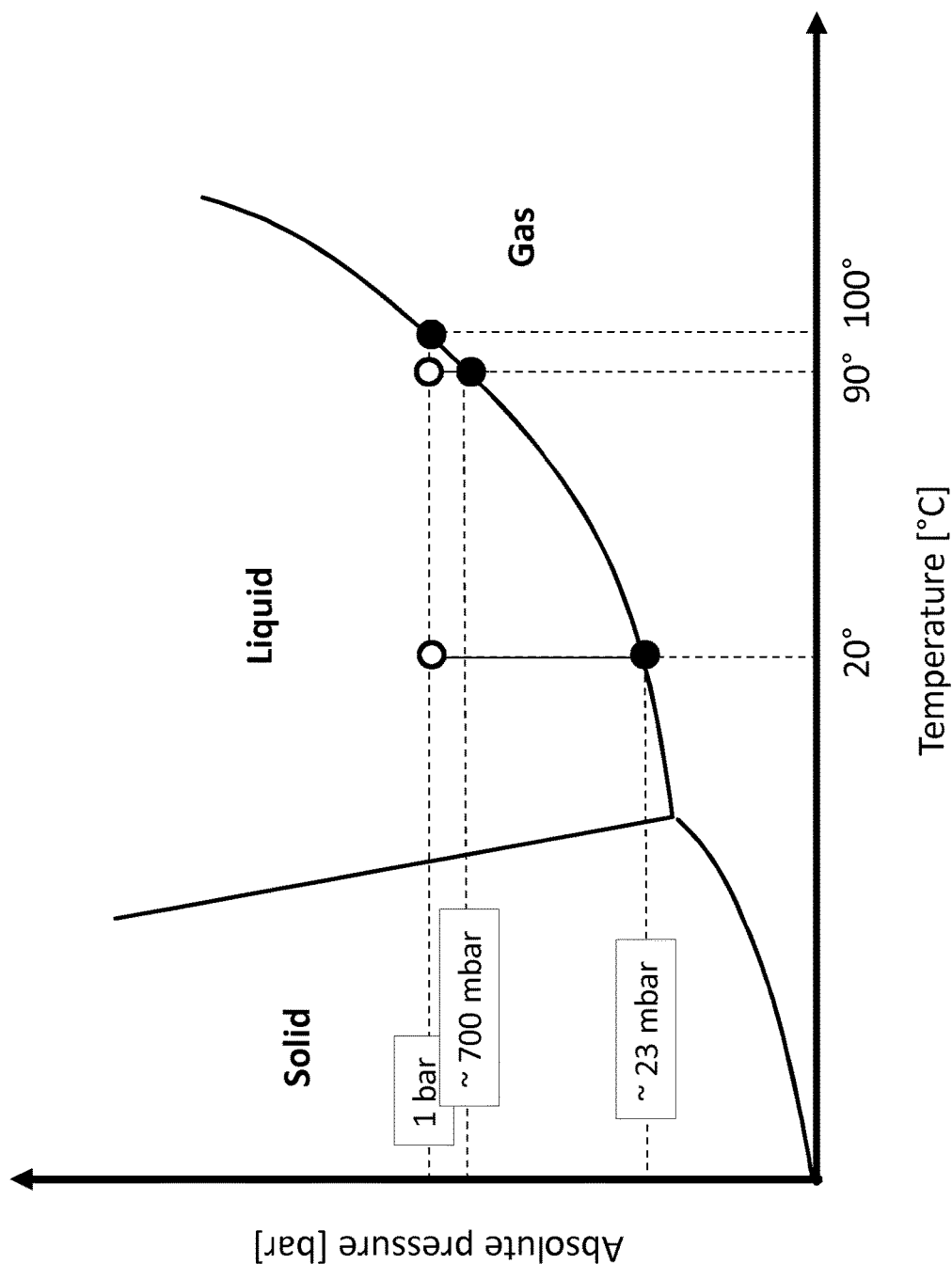
FIG. 3 shows a phase diagram of water.
Figure 4:
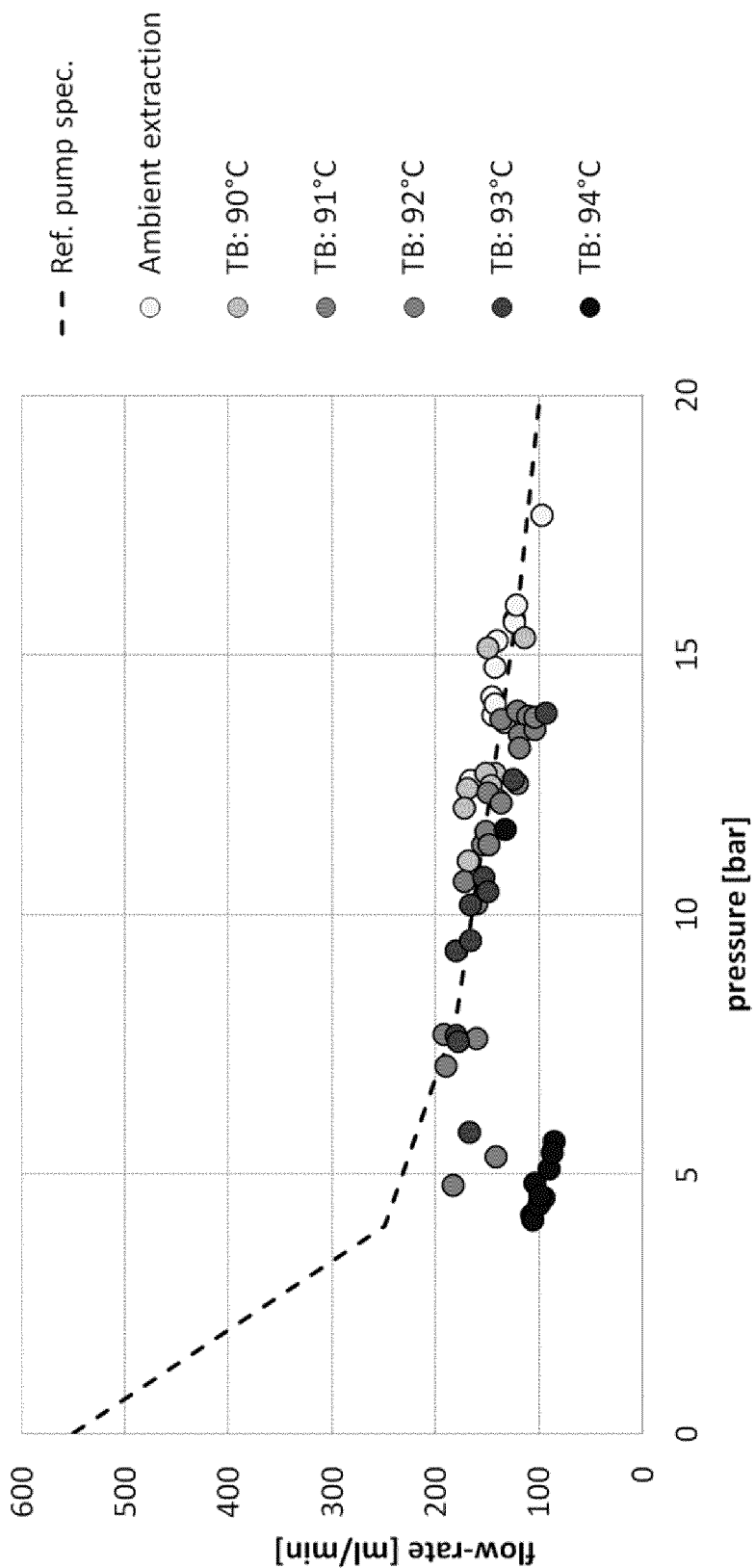
FIG. 4 shows a comparison of the pump performance of the state of the art at different liquid temperatures.

The pumping system 1 of FIG. 8 avoids a costly single main pump 14, as is used in the state of the art. Typically a single main pump 14 delivers a similar extraction pressure for each extraction unit 161-164 (see FIG. 2). Preferably, in the pumping system 1 of the present invention according to FIG. 8, each main pump 4 can be operated independently.

Furthermore, preferably each beverage extraction unit 61-64 can be operated independently and with different operation parameters. Different beverages to be produced from different beverage ingredients require different operation parameters, for example, different pressures of the supplied liquid. Espresso, for example, requires higher liquid pressures, while tea requires lower liquid pressures. Therefore, preferably each extraction unit 61-64 has a dedicated main pump 4, which is selected according to the respective beverage produced by the beverage extraction unit 61-64. In other words, a beverage extraction unit 61 for preparing espresso is connected to a higher-pressure main pump 4. A beverage extraction unit 62 for preparing tea is connected to a cheaper lower-pressure main pump 4. The pump system 1 of the present invention therefore offers a greater versatility than the state of the art.

Figure 9:
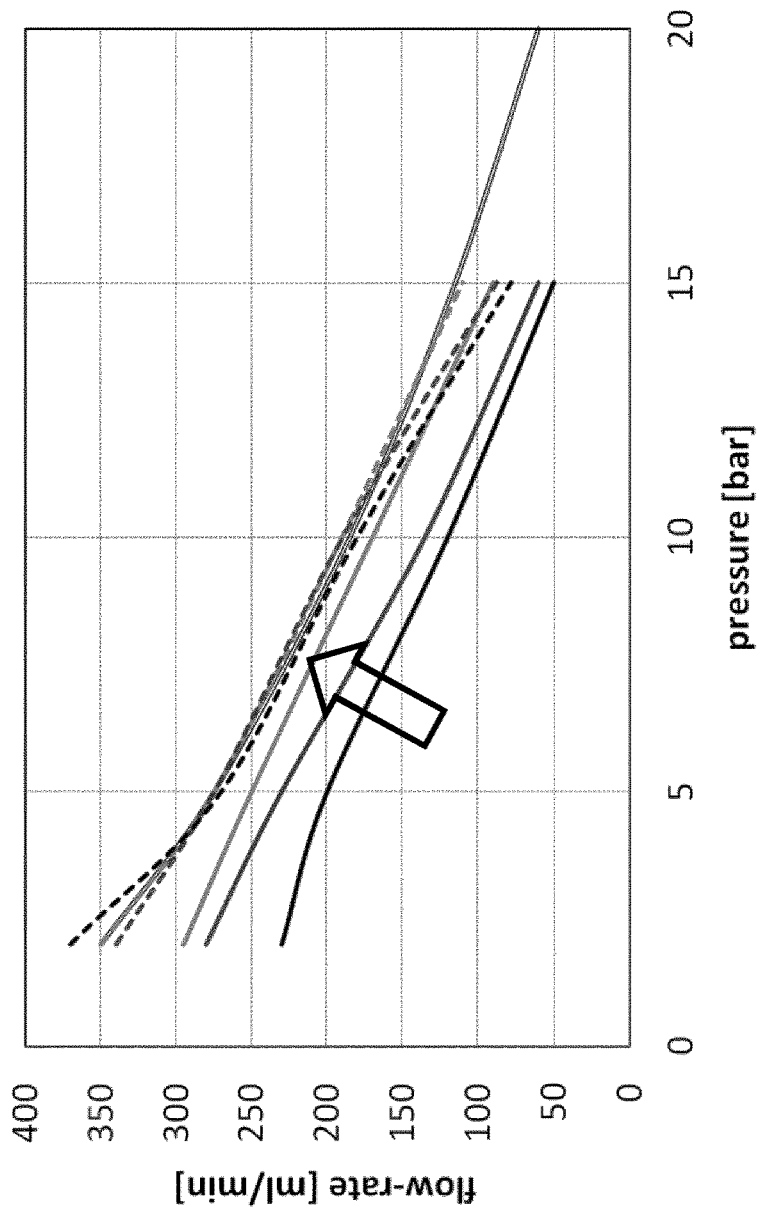
FIG. 9 shows the pump performance at different liquid temperatures and different reservoir pressures.

FIG. 9 shows how with the pumping system 1 and method of the present invention it is possible to achieve a high pumping performance even at elevated liquid temperatures by means of a pressurized reservoir 2. FIG. 9 shows in particular a performance chart (i.e. flow rate vs. output pressure) of a main pump 4 of the present invention. It can be seen that the ideal performance curve, which is achieved by the main pump 4 at ambient temperatures and a non-pressurized reservoir 2, is more or less matched at a liquid temperature of 95° C. when the pressure in the reservoir 2 is increased to 0.7 bar or more.

Due to the suppression of cavitation by increasing the reservoir pressure, the pumping performance of the main pump 4 is increased as well. Thus, it becomes possible to pump a preheated liquid from the reservoir 2 to the extraction unit 6 of a beverage production apparatus, without any loss in pump performance. A heater, a boiler or any other heating means provided after (downstream) the main pump 4 can be omitted. It is further noted that the suppression of cavitation also reflects in the sound of the pump. The main pump 4 is not only able to pump with increased performance (or at least not with a significantly worse performance than at ambient temperatures), but is moreover able to operate more silently.

In summary, the present invention describes a pumping system 1 with a preheated reservoir 2, a main pump 4 for pumping the preheated liquid 3, and pressurizing means 5 for pressurizing the liquid 3 in the reservoir 2. The present invention achieves a nearly complete suppression of the cavitation phenomenon, and thus an increased pumping performance at elevated liquid temperatures.

The invention claimed is:

1. A pumping system for a beverage production apparatus, the pumping system comprising:
   a reservoir for storing and heating a liquid;
   a liquid supply configured to supply the liquid to the reservoir;
   a pressurizer for pressurizing the reservoir, the pressurizer is configured to pressurize the reservoir to an absolute pressure of 0.7 to 1.0 bar, the pressurizer is positioned downstream from the liquid supply, and the pressurizer is positioned upstream from the reservoir, wherein the pressurizer is an air pump;
   a plurality of beverage extraction units each configured to be operated independently to produce different beverages with different operation parameters; and
   a plurality of main pumps, wherein each of the plurality of main pumps is dedicated to a corresponding beverage extraction unit and is configured to pump the liquid from the reservoir and into the corresponding beverage extraction unit.

2. The pumping system according to claim 1, wherein the pressurizer is a unit for controlling a liquid level and a liquid temperature in the reservoir.

3. The pumping system according to claim 1, wherein the reservoir is a thermos.

4. The pumping system according to claim 1, wherein each one of the plurality of main pumps is configured to pump the liquid with a respective pressure of the corresponding beverage extraction unit.

5. The pumping system according to claim 1, wherein the reservoir is a low pressure boiler supporting a pressure of about 1 to 3 bar.

6. The pumping system according to claim 1, wherein the plurality of main pumps is configured to receive the liquid from the liquid supply.

7. The pumping system according to claim 1, wherein the reservoir is configured to heat the liquid to a temperature up to about 95° C.

8. The pumping system according to claim 7, wherein each of the plurality of main pumps is configured to pump the liquid heated to the temperature up to about 95° C. with a maximum flow rate of about 100 to 300 ml/min at a maximum output pressure of respectively about 14 to 3 bar.

9. The pumping system according to claim 1, wherein the air pump is configured to control a liquid level in the reservoir.

10. The pumping system according to claim 1, wherein the different operation parameters comprise different liquid pressures.

11. A pumping method for use in a beverage production apparatus, the method comprising:
    supplying a liquid from a liquid supply to a reservoir;
    heating the liquid in the reservoir;
    pressurizing the reservoir with an air pump positioned downstream from the liquid supply and positioned upstream from the reservoir, the air pump configured to pressurize the reservoir to an absolute pressure of 0.7 to 1.0 bar;
    pumping the liquid from the reservoir with a plurality of main pumps to a plurality of beverage extraction units, each of the plurality of pumps corresponding to a dedicated beverage extraction unit; and
    operating each of the plurality of beverage extraction units independently to produce different beverages with different operation parameters.

12. The pumping method according to claim 11, wherein the liquid is heated to a temperature up to about 95° C.

13. The pumping method according to claim 11, wherein the different operation parameters comprise different liquid pressures.

* * * * *